United States Patent
Shi et al.

(10) Patent No.: US 12,153,554 B2
(45) Date of Patent: Nov. 26, 2024

(54) SYSTEMS AND METHODS FOR REMOVAL OF ATTRIBUTES FROM MULTI-MODALITY AND MULTI-ATTRIBUTE DATA

(71) Applicant: JPMORGAN CHASE BANK, N.A., New York, NY (US)

(72) Inventors: Zhonghao Shi, Los Angeles, CA (US); Richard Chen, Baldwin Place, NY (US); Shaohan Hu, Yorktown Heights, NY (US); William Moriarty, West Chester, PA (US); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/934,935

(22) Filed: Sep. 23, 2022

(65) Prior Publication Data
US 2024/0104070 A1   Mar. 28, 2024

(51) Int. Cl.
*G06F 16/215* (2019.01)
*G06F 16/28* (2019.01)

(52) U.S. Cl.
CPC .......... *G06F 16/215* (2019.01); *G06F 16/285* (2019.01)

(58) Field of Classification Search
CPC .............................. G06F 16/215; G06F 16/285
USPC ........................................................ 707/692
See application file for complete search history.

(56) References Cited

U.S. PATENT DOCUMENTS

| | | | |
|---|---|---|---|
| 9,811,780 B1* | 11/2017 | Aradhye | G06N 20/00 |
| 11,574,551 B1* | 2/2023 | Sabapathy | G09B 3/02 |
| 2011/0093468 A1* | 4/2011 | McAlvany | G06F 16/93 |
| | | | 707/758 |
| 2011/0137870 A1* | 6/2011 | Feder | H04L 67/1001 |
| | | | 707/662 |
| 2012/0005248 A1* | 1/2012 | Garudadri | H03M 7/3062 |
| | | | 708/207 |
| 2014/0257938 A1* | 9/2014 | Green | G06Q 50/12 |
| | | | 705/7.38 |
| 2018/0165554 A1* | 6/2018 | Zhang | G06F 18/2411 |
| 2019/0034801 A1* | 1/2019 | Sodhani | G06N 3/045 |

(Continued)

*Primary Examiner* — Cam Linh T Nguyen
(74) *Attorney, Agent, or Firm* — GREENBERG TRAURIG LLP

(57) ABSTRACT

A method for removing uninterested attributes from multi-modality data may include: receiving, by a multi-modality attribute removal computer program executed by an electronic device, multi-modality data comprising a plurality of modalities from a data source, wherein data in each modality are related; receiving, by the multi-modality attribute removal computer program, an uninterested attribute in the multi-modality data to remove; training, by the multi-modality attribute removal computer program, a modality-focused encoder for each modality of the multi-modality data to remove the uninterested attribute using a removal loss and a retention loss for the respective modality; receiving, by the multi-modality attribute removal computer program, a multi-modality data set for processing; and processing, by the multi-modality attribute removal computer program, the multi-modality data set using the modality-focused encoders, wherein the processing results in a processed multi-modality data set with the uninterested attribute removed and one or more interested attribute retained.

20 Claims, 3 Drawing Sheets

(56) References Cited

U.S. PATENT DOCUMENTS

| | | | |
|---|---|---|---|
| 2019/0228073 A1* | 7/2019 | Chatterjee | G06F 16/3344 |
| 2019/0294671 A1* | 9/2019 | Chatterjee | G06F 40/268 |
| 2021/0034984 A1* | 2/2021 | Savvides | G06F 17/16 |
| 2021/0201412 A1* | 7/2021 | Goh | G06Q 40/02 |
| 2021/0303818 A1* | 9/2021 | Randolph | G06N 5/045 |
| 2021/0357207 A1* | 11/2021 | Copty | G06F 18/241 |
| 2022/0254162 A1* | 8/2022 | Felemban | G06V 20/49 |
| 2023/0289434 A1* | 9/2023 | Baker | G06F 21/55 |
| | | | 726/22 |

\* cited by examiner

SYSTEMS AND METHODS FOR REMOVAL OF ATTRIBUTES FROM MULTI-MODALITY AND MULTI-ATTRIBUTE DATA

BACKGROUND OF THE INVENTION

1. Field of the Invention

Embodiments generally relate to systems and methods for removal of attributes from multi-modality and multi-attribute data.

2. Description of the Related Art

In general, attribute removal techniques focus on single-modality datasets, such as visual datasets, voice datasets, etc. With multi-modality datasets, existing methods assume that data from different modalities are independent from each other, and the output multimodal structure is not important. These two assumptions are overly simplified and untrue and lead to poor effectiveness of the attribute removal in multimodal setting. This may result in attribute leakage.

SUMMARY OF THE INVENTION

Systems and methods for removal of attributes from multi-modality and multi-attribute data are disclosed. In one embodiment, a method for removing uninterested attributes from multi-modality data may include: (1) receiving, by a multi-modality attribute removal computer program executed by an electronic device, multi-modality data comprising a plurality of modalities from a data source, wherein data in each modality are related; (2) receiving, by the multi-modality attribute removal computer program, an uninterested attribute in the multi-modality data to remove; (3) training, by the multi-modality attribute removal computer program, a modality-focused encoder for each modality of the multi-modality data to remove the uninterested attribute using a removal loss and a retention loss for the respective modality; (4) receiving, by the multi-modality attribute removal computer program, a multi-modality data set for processing; and (5) processing, by the multi-modality attribute removal computer program, the multi-modality data set using the modality-focused encoders, wherein the processing results in a processed multi-modality data set with the uninterested attribute removed and one or more interested attribute retained.

In one embodiment, the removal loss comprises a cosine distance, and the retention loss comprises a L2 norm.

In one embodiment, the method may also include pre-training, by the multi-modality attribute removal computer program, a single modality reidentification classifier for each modality of the multi-modality data and a multi-modality reidentification classifier for the multi-modality data to remove the uninterested attribute resulting in removal losses and retention losses.

In one embodiment, the removal losses represent a loss associated with reidentification of the uninterested attribute in outputs of the single modality reidentification classifiers and the multi-modality reidentification classifier, and the retention losses represent a loss of utility of retained data in the outputs of the single modality reidentification classifiers and the multi-modality reidentification classifier.

In one embodiment, the single modality reidentification classifiers and the multi-modality reidentification classifier are pre-trained by with cross-entropy loss and back propagation with Stochastic Gradient Descent (SGD).

In one embodiment, the step of training the modality-focused encoder for each modality of the multi-modality data using the removal loss and the retention loss for the respective modality comprises: receiving, by the multi-modality attribute removal computer program, a plurality of additional multi-modality data sets; and receiving, by the multi-modality attribute removal computer program, an identification of an uninterested attribute in the multi-modality data to conceal and an interested attribute in the multi-modality data to retain. The modality-focused encoders are trained using the removal loss and the retention loss for the respective modality, the plurality of additional multi-modality data sets, the uninterested attribute, and the interested attribute.

According to another embodiment, a system may include a multi-modality data source comprising multi-modality data comprising a, wherein data in each modality are related and a multi-modality attribute removal computer program comprising a modality-focused encoder for each modality in the multi-modality data, a modality reidentification classifier for each modality in the multi-modality data, and a multi-modality reidentification classifier. The multi-modality attribute removal computer program receives the multi-modality data from the multi-modality data source, receives an uninterested attribute in the multi-modality data to remove, trains the modality-focused encoders to remove the uninterested attribute using a removal loss and a retention loss for the respective modality, receives a multi-modality data set for processing, and processes the multi-modality data set using the modality-focused encoders, wherein the processing results in a processed multi-modality data set with the uninterested attribute removed and one or more interested attribute retained.

In one embodiment, the removal loss comprises a cosine distance, and the retention loss comprises a L2 norm.

In one embodiment, the multi-modality attribute removal computer program pre-trains a single modality reidentification classifier for each modality of the multi-modality data and a multi-modality reidentification classifier for the multi-modality data to remove the uninterested attribute resulting in removal losses and retention losses.

In one embodiment, the removal losses represent a loss associated with reidentification of the uninterested attribute in outputs of the single modality reidentification classifiers and the multi-modality reidentification classifier, and the retention losses represent a loss of utility of retained data in the outputs of the single modality reidentification classifiers and the multi-modality reidentification classifier.

In one embodiment, the single modality reidentification classifiers and the multi-modality reidentification classifier are pre-trained by with cross-entropy loss and back propagation with Stochastic Gradient Descent (SGD).

In one embodiment, the modality-focused encoder are trained by: receiving a plurality of additional multi-modality data sets; and receiving an identification of an uninterested attribute in the multi-modality data to conceal and an interested attribute in the multi-modality data to retain. The modality-focused encoders are trained using the removal loss and the retention loss for the respective modality, the plurality of additional multi-modality data sets, the uninterested attribute, and the interested attribute.

In one embodiment, the uninterested attribute comprises identity.

According to another embodiment, a non-transitory computer readable storage medium, may include instructions stored thereon, which when read and executed by one or more computer processors, cause the one or more computer processors to perform steps comprising: receiving multi-modality data comprising a plurality of modalities from a data source, wherein data in each modality are related; receiving an uninterested attribute in the multi-modality data to remove; training a modality-focused encoder for each modality of the multi-modality data to remove the uninterested attribute using a removal loss and a retention loss for the respective modality; receiving a multi-modality data set for processing; and processing the multi-modality data set using the modality-focused encoders, wherein the processing results in a processed multi-modality data set with the uninterested attribute removed and one or more interested attribute retained.

In one embodiment, the removal loss comprises a cosine distance, and the retention loss comprises a L2 norm.

In one embodiment, the non-transitory computer readable storage medium of claim 14, also includes instructions stored thereon, which when read and executed by one or more computer processors, cause the one or more computer processors to pre-train a single modality reidentification classifier for each modality of the multi-modality data and a multi-modality reidentification classifier for the multi-modality data to remove the uninterested attribute resulting in removal losses and retention losses.

In one embodiment, the removal losses represent a loss associated with reidentification of the uninterested attribute in outputs of the single modality reidentification classifiers and the multi-modality reidentification classifier, and the retention losses represent a loss of utility of retained data in the outputs of the single modality reidentification classifiers and the multi-modality reidentification classifier.

In one embodiment, the single modality reidentification classifiers and the multi-modality reidentification classifier are pre-trained by with cross-entropy loss and back propagation with Stochastic Gradient Descent (SGD).

In one embodiment, the modality-focused encoder for each modality of the multi-modality data are trained by: receiving a plurality of additional multi-modality data sets; and receiving an identification of an uninterested attribute in the multi-modality data to conceal and an interested attribute in the multi-modality data to retain. The modality-focused encoders are trained using the removal loss and the retention loss for the respective modality, the plurality of additional multi-modality data sets, the uninterested attribute, and the interested attribute.

In one embodiment, the non-transitory computer readable storage medium also includes instructions stored thereon, which when read and executed by one or more computer processors, cause the one or more computer processors to output the processed multi-modality data set with the uninterested attribute removed and one or more interested attribute retained to a downstream system.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for removal of attributes from multi-modality and multi-attribute data. The modalities in multi-modality data may be related to each other. For example, data in an audio modality may be related to data in a visual modality.

In embodiments, target attributes, such as identity, may be removed from multimodal multi-attribute datasets, while the utility of the attributes for other downstream tasks may be retained.

In addition to the unimodal losses associated with removing attributes within each modality, embodiments may include multi-modal losses to train modality-focused encoders to learn and remove the potential attribute leakage across modalities. Unimodal (i.e., single modality) and multimodal losses include removal losses and retention losses. For example, the removal losses may represent a loss associated with reidentification of the uninterested attribute in outputs of the single modality reidentification classifiers and the multi-modality reidentification classifier, and the retention losses may represent a loss of utility of the retained data in the outputs of the single modality reidentification classifiers and the multi-modality reidentification classifier.

Embodiments may include modality-focused recovery loss to make sure the modality-focused encoders make as little edits on the original data as possible. Thus, separate data representation for each modality as output may be obtained.

Embodiments may jointly train the modality-focused encoders for each modality with unimodal, multimodal, and modality-focused recovery losses. The trained modality-focused encoders may be deployed according to the needs of users. The trained modality-focused encoders may remove target attributes both within and across modalities, while outputting separate data representation for each modality.

Embodiments may prevent the leakage of target attribute information across multiple modalities. Because fused multi-modality data is used as the input to trained modality-focused encoders, the encoders can learn about the dependencies between modalities in relation to the target attributes. In this way, the removal process is thorough both within and across modalities.

In addition, embodiments may allow for separate data representation(s) for each modality. Thus, downstream tasks are not forced to use the complete set of modalities as the input of their downstream tasks. This provides flexibility to the allowed downstream tasks.

Figure 1:
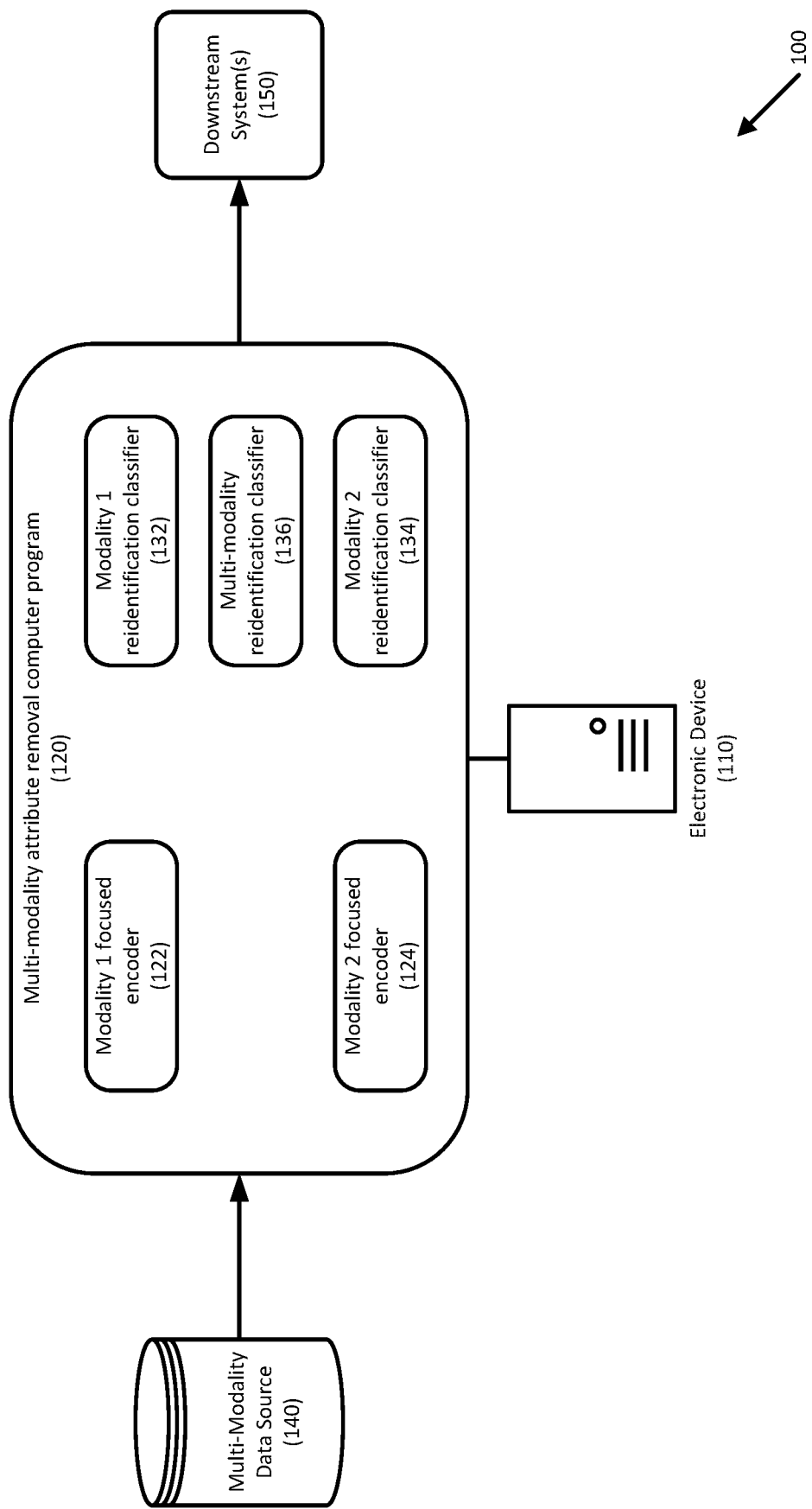
FIG. 1 depicts a system for removal of attributes from multi-modality and multi-attribute data according to an embodiment.

Referring to FIG. 1, a system for removal of attributes from multi-modality and multi-attribute data is disclosed according to embodiments. System 100 may include electronic device 110, which may be any suitable electronic device, including servers (e.g., cloud-based and/or physical), computers (e.g., workstations, desktops, laptops, notebooks, tablets, etc.), smart devices, Internet of Things appliances, etc.

Electronic device 110 may execute multi-modality attribute removal computer program 120, which may receive multi-modality data from multi-modality data source 140. Multi-modality data may include data that has at least two modalities. An example is a stream including both visual data and audio data.

Examples of modalities include audio, visual, natural language, etc.

Multi-modality attribute removal computer program 120 may include a plurality of modules, such as modality 1 focused encoder 122, modality 2 focused encoder 124, modality 1 reidentification classifier 132, modality 2 reidentification classifier 134, and multi-modality reidentification classifier 136. Modality 1 reidentification classifier 132 may process for a first modality of the multimodality data, modality 2 reidentification classifier 134 may process a second modality of the multimodality data, and multi-modality reidentification classifier 136 may process data for all modalities in the multimodality data. Reidentification classifiers 132, 134, and 136 may combine processed data for individual modalities in the multi-modality data or for the multi-modality attribute data to identify removal losses and retention losses.

Each modality-focused encoder 122, 124 may be a computer program that focuses on a particular modality, and may remove attributes from their respective modalities while retaining the utility of the multi-modality data for downstream systems 150.

Although FIG. 1 depicts only two modality-focused encoders 122, 124, it should be recognized that additional modality-focused encoders may be provided as is necessary and/or desired.

Modality 1 reidentification classifier 132, modality 2 reidentification classifier 134, and multi-modality reidentification classifier 136 may help derive the removal loss (e.g., a cosine difference) by comparing the outputs of these classifiers—e.g., data representations with the uninterested attribute removed—and the original data, and a retention loss (e.g., L2 or Euclidean norm) between the original data and the processed data with the uninterested attribute removed for each modality, or for the multi-modality data. The losses may be used to train modality-focused encoders 122, 124.

In one embodiment, modality-focused encoders 122, 124 may be focused using techniques used with generative adversarial networks (GANs).

In one embodiment, re-identification classifiers 132, 134, and/or 136 may be pre-trained based on standard cross-entropy loss when attribute labels are provided.

Figure 2:
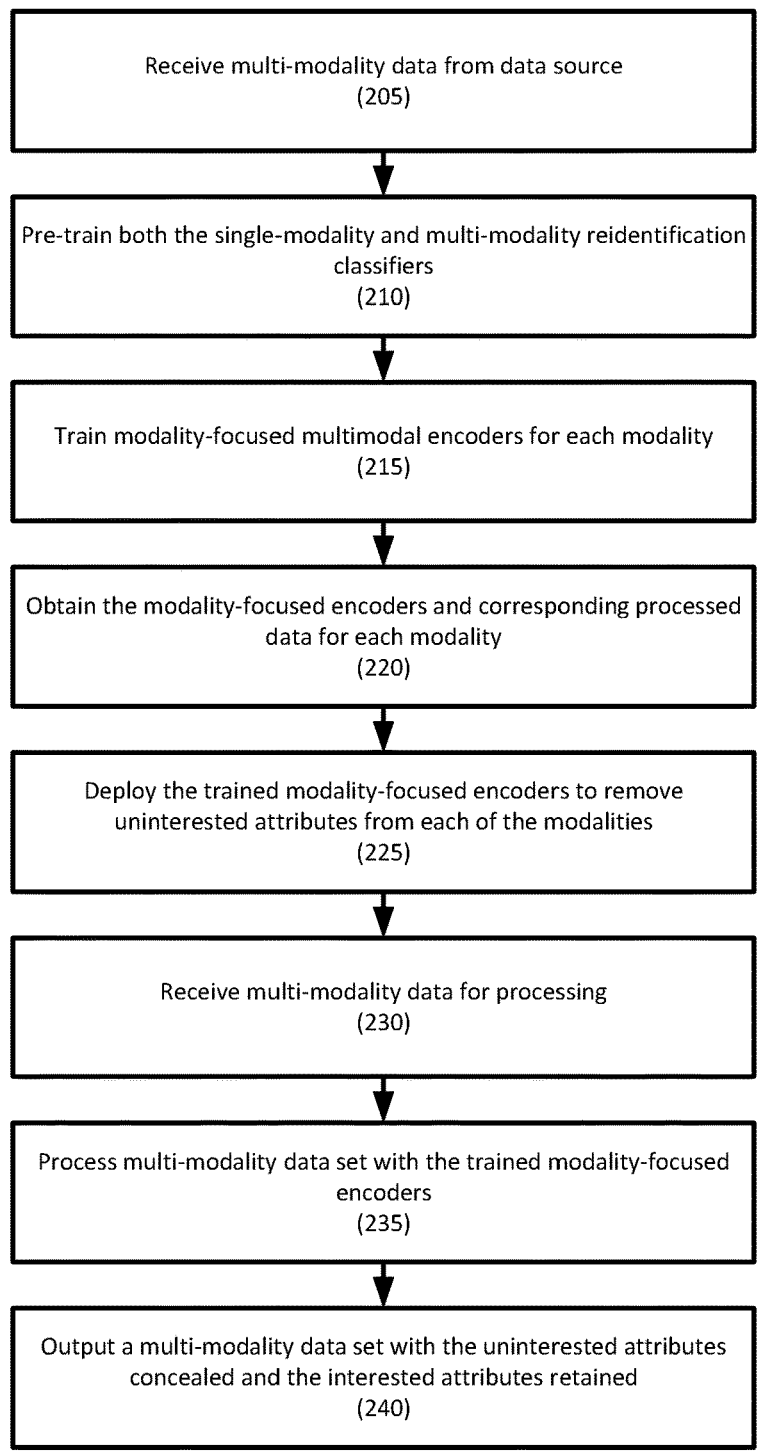
FIG. 2 depicts a method for removal of attributes from multi-modality and multi-attribute data according to an embodiment.

Referring to FIG. 2, a method for removal of attributes from multi-modality and multi-attribute data is disclosed according to embodiments.

In step 205, a multi-modality attribute removal computer program may receive multimodal data from data source. For example, the multimodal data may include that that includes both audio and visual modalities. Other modalities may be included as is necessary and/or desired.

In one embodiment, the multimodality data may be separated into different modalities by automated or manual data extraction techniques, such as speech-to-text transcribing. Any suitable technique to separate the modalities from the multimodality may be used as is necessary and/or desired.

In another embodiment, the modality data may be collected separately using different sensors (e.g., microphones to collect audio modality data, cameras to capture video modality data), etc.

In one embodiment, the attribute(s) to remove (i.e., the uninterested attributes) may be identified. An example of an uninterested attribute is identity. In one embodiment, the attributes to retain (e.g., the interested attributes) may also be identified.

In step 210, the multi-modality attribute removal computer program may pre-train both single modality reidentification classifiers and a multi-modality reidentification classifiers and attribute classifiers to remove the uninterested attribute(s). For example, the reidentification classifiers may identify the removal loss (e.g., a cosine difference) between each space and associated attributes, as well as a retention loss (e.g., L2 or Euclidean norm) between the original data and the processed data for each modality, or for the multi-modality data. In one embodiment, the reidentification classifiers may be pre-trained using back propagation and optimized using, for example, Stochastic Gradient Descent (SGD).

Single-modality re-identification classifiers may be pre-trained with only one modality of the multi-modality data. Multi-modality re-identification classifiers may be pre-trained with all the multimodal combinations. For example, if there are three modalities, there are three single-modality classifiers, and four multi-modality classifiers.

The process of training the reidentification classifiers may be considered to be pre-training because the reidentification classifiers are trained before the modality-focused encoders are trained. The processes for pre-training and training may be similar (e.g., back propagation and optimization using SGD).

In one embodiment, in pre-training and/or training, the multi-modality attribute removal computer program may receive a number of additional data sets to be used and an attribute to retain (e.g., an interested attribute) and an attribute to conceal (e.g., an uninterested attribute). In one embodiment, the multi-modality attribute removal computer program may receive the number of additional multimodality data sets to use to conceal or remove an attribute. For example, the attribute remove computer program may receive an identification that identity is the attribute to remove, and may receive other multimodality data sets to use to remove the identity.

In step 215, the multi-modality attribute removal computer program may train modality-focused encoders to remove the attribute(s) for each modality. In embodiments, the removal loss and the retention loss may be used to train the encoders. For example, using back propagation and SGD, parameters for the modality-focused encoders are updated to minimize removal losses. Once the low removal loss is below a certain threshold, the modality-focused encoders are trained to remove the uninterested attribute(s).

In step 220, the multi-modality attribute removal computer program may train the modality-focused encoders, and may evaluate their performance. In one embodiment, the multimodal removal loss and the retention losses may be used to train the encoders.

In step 225, the trained modality-focused encoders may be deployed to conceal or remove uninterested attributes from each of the modalities in the multi-modality data.

In step 230, the multi-modality attribute removal computer program may receive multi-modality data for processing. For example, the multi-modality attribute removal computer program may receive multi-modality data including several attributes, including the attribute(s) to conceal or retain. In one embodiment, the multi-modality data may be received as streaming data, may be processed in batches, etc.

In step 235, the multi-modality attribute removal computer program may process the multi-modality data using the trained modality-focused encoders and different additional multi-modality data sets.

Figure 3:
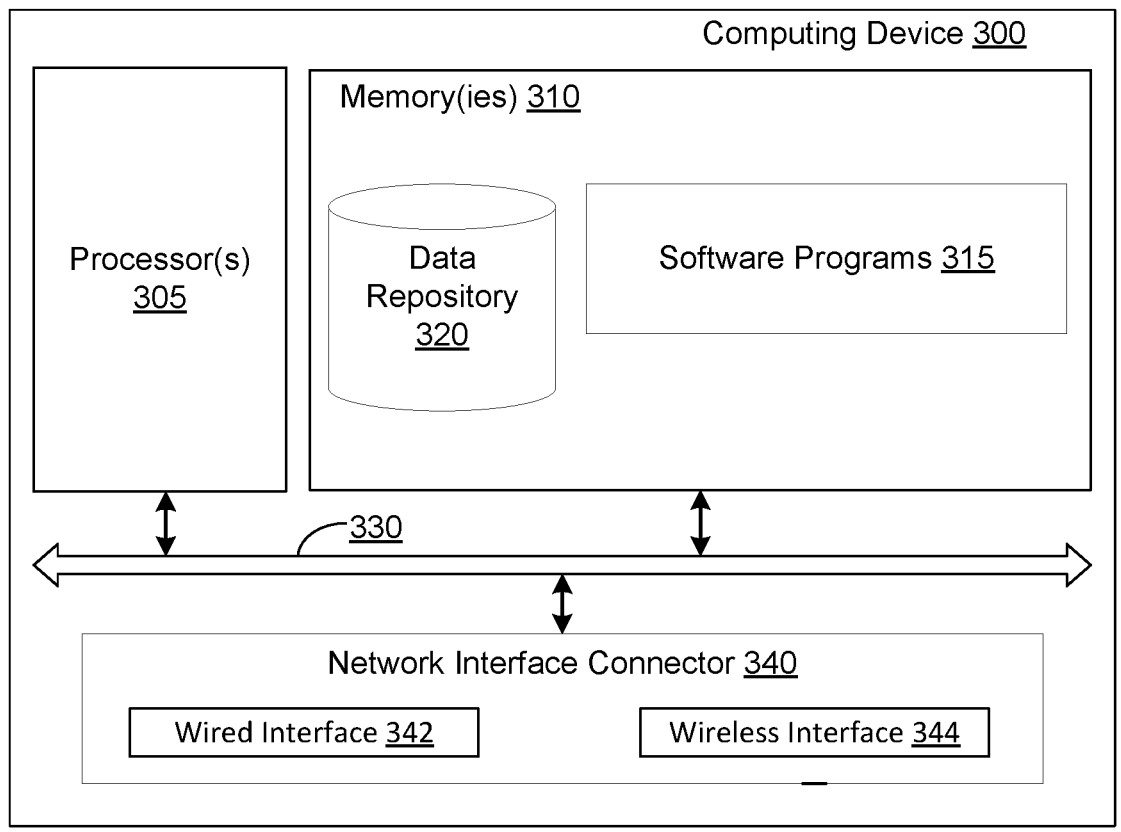
FIG. 3 depicts an exemplary computing system for implementing aspects of the present disclosure.

In step 240, the multi-modality attribute removal computer program may output a multi-modality data set with the uninterested attribute removed, and the interested attributes retained. The data set may be used by one or more downstream system as is necessary and/or desired FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

The disclosures of U.S. Provisional Patent Application Ser. Nos. 63/126,935 and 63/138,951, U.S. patent application Ser. No. 17/538,763, and U.S. patent application Ser. No. 17/664,579 are hereby incorporated, by reference, in their entireties.

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for removing uninterested attributes from multi-modality data, comprising:

receiving, by a multi-modality attribute removal computer program executed by an electronic device, multi-modality training data comprising audio training data for an audio modality and visual training data for a visual modality from a data source, wherein the audio training data and the visual training data are related, and a change in the audio training data causes a change in the visual training data;

receiving, by the multi-modality attribute removal computer program, an identification of an uninterested attribute to remove from the multi-modality training data and an identification of an interested attribute to retain in the multi-modality training data;

training, by the multi-modality attribute removal computer program, a modality-focused encoder for each of the audio modality and the visual modality of the multi-modality data to remove the identified uninterested attribute using a removal loss and a retention loss for the respective modality;

receiving, by the multi-modality attribute removal computer program, a processing multi-modality data set comprising audio data for the audio modality and visual data for the visual modality; and processing, by the multi-modality attribute removal computer program, the processing multi-modality data set using the modality-focused encoders, wherein the processing results in a processed multi-modality data set with the uninterested attribute removed and the interested attribute retained.

2. The method of claim 1, wherein the removal loss comprises a cosine distance, and the retention loss comprises a L2 norm.

3. The method of claim 1, further comprising:
pre-training, by the multi-modality attribute removal computer program, a single modality reidentification classifier for each of the audio modality and the visual modality of the multi-modality data and a multi-modality reidentification classifier for the multi-modality data to remove the uninterested attribute resulting in removal losses and retention losses.

4. The method of claim 3, wherein the removal losses represent a loss associated with reidentification of the uninterested attribute in outputs of the single modality reidentification classifiers and the multi-modality reidentification classifier, and the retention losses represent a loss of utility of retained data in the outputs of the single modality reidentification classifiers and the multi-modality reidentification classifier.

5. The method of claim 3, wherein the single modality reidentification classifiers and the multi-modality reidentification classifier are pre-trained by with cross-entropy loss and back propagation with Stochastic Gradient Descent (SGD).

6. The method of claim 1, wherein the step of training the modality-focused encoder for each of the audio modality and the visual modality of the multi-modality data using the removal loss and the retention loss for the respective modality comprises:
receiving, by the multi-modality attribute removal computer program, a plurality of additional multi-modality data sets;
wherein the modality-focused encoders are trained using the removal loss and the retention loss for the respective modality, the plurality of additional multi-modality data sets, the uninterested attribute, and the interested attribute.

7. A system, comprising:
a multi-modality data source comprising multi-modality training data comprising audio training data for an audio modality and visual training data for a visual modality, wherein the audio training data and the visual training data are related, and a change in the audio training data causes a change in the visual training data; and
an electronic device comprising at least one computer program and executing a multi-modality attribute removal computer program comprising a modality-focused encoder for each of the audio modality and the visual modality in the multi-modality data, a modality reidentification classifier for each of the audio modality and the visual modality in the multi-modality data, and a multi-modality reidentification classifier;
wherein:
the multi-modality attribute removal computer program receives the multi-modality training data from the multi-modality data source;
the multi-modality attribute removal computer program receives an identification of an uninterested attribute in the multi-modality data to remove and an identification of an interested attribute to retain;
the multi-modality attribute removal computer program trains the modality-focused encoders to remove the identified uninterested attribute using a removal loss and a retention loss for the respective modality;
the multi-modality attribute removal computer program receives a processing multi-modality data set; and
the multi-modality attribute removal computer program processes the processing multi-modality data set using the modality-focused encoders, wherein the processing results in a processed multi-modality data set with the uninterested attribute removed and the interested attribute retained.

8. The system of claim 7, wherein the removal loss comprises a cosine distance, and the retention loss comprises a L2 norm.

9. The system of claim 7, wherein the multi-modality attribute removal computer program pre-trains a single modality reidentification classifier for each of the audio modality and the visual modality of the multi-modality data and a multi-modality reidentification classifier for the multi-modality data to remove the uninterested attribute resulting in removal losses and retention losses.

10. The system of claim 9, wherein the removal losses represent a loss associated with reidentification of the uninterested attribute in outputs of the single modality reidentification classifiers and the multi-modality reidentification classifier, and the retention losses represent a loss of utility of retained data in the outputs of the single modality reidentification classifiers and the multi-modality reidentification classifier.

11. The system of claim 9, wherein the single modality reidentification classifiers and the multi-modality reidentification classifier are pre-trained by with cross-entropy loss and back propagation with Stochastic Gradient Descent (SGD).

12. The system of claim 7, wherein the modality-focused encoder are trained by:
receiving a plurality of additional multi-modality data sets;
wherein the modality-focused encoders are trained using the removal loss and the retention loss for the respective modality, the plurality of additional multi-modality data sets, the uninterested attribute, and the interested attribute.

13. The system of claim 7, wherein the uninterested attribute comprises identity.

14. A non-transitory computer readable storage medium, including instructions stored thereon, which when read and executed by one or more computer processors, cause the one or more computer processors to perform steps comprising:
receiving multi-modality training data comprising audio training data for an audio modality and visual training data for a visual modality from a data source, wherein the audio training data and the visual training data are related, and a change in the audio training data causes a change in the visual training data;
receiving an identification of an uninterested attribute to remove from the multi-modality training data and an identification of an interested attribute to retain in the multi-modality training data;
training a modality-focused encoder for each of the audio modality and the visual modality of the multi-modality data to remove the identified uninterested attribute using a removal loss and a retention loss for the respective modality;
receiving a processing multi-modality data set comprising processing audio data for the audio modality and processing visual data for the visual modality; and processing the processing multi-modality data set using the modality-focused encoders, wherein the processing results in a processed multi-modality data set with the uninterested attribute removed and the interested attribute retained.

15. The non-transitory computer readable storage medium of claim 14, wherein the removal loss comprises a cosine distance, and the retention loss comprises a L2 norm.

16. The non-transitory computer readable storage medium of claim 14, further comprising instructions stored thereon, which when read and executed by one or more computer processors, cause the one or more computer processors to pre-train a single modality reidentification classifier for each of the audio modality and the visual modality of the multi-modality data and a multi-modality reidentification classifier for the multi-modality data to remove the uninterested attribute resulting in removal losses and retention losses.

17. The non-transitory computer readable storage medium of claim 16, wherein the removal losses represent a loss associated with reidentification of the uninterested attribute in outputs of the single modality reidentification classifiers and the multi-modality reidentification classifier, and the retention losses represent a loss of utility of retained data in the outputs of the single modality reidentification classifiers and the multi-modality reidentification classifier.

18. The non-transitory computer readable storage medium of claim 16, wherein the single modality reidentification classifiers and the multi-modality reidentification classifier are pre-trained by with cross-entropy loss and back propagation with Stochastic Gradient Descent (SGD).

19. The non-transitory computer readable storage medium of claim 16, wherein the modality-focused encoder for each of the audio modality and the visual modality of the multi-modality data are trained by:
  receiving a plurality of additional multi-modality data sets;
  wherein the modality-focused encoders are trained using the removal loss and the retention loss for the respective modality, the plurality of additional multi-modality data sets, the uninterested attribute, and the interested attribute.

20. The non-transitory computer readable storage medium of claim 14, further comprising instructions stored thereon, which when read and executed by one or more computer processors, cause the one or more computer processors to output the processed multi-modality data set with the uninterested attribute removed and one or more interested attribute retained to a downstream system.

* * * * *